United States Patent [19]

Brissey et al.

[11] 4,025,840

[45] May 24, 1977

[54] PERMANENT MAGNET GENERATOR WITH OUTPUT POWER ADJUSTMENT BY MEANS OF MAGNETIC SHIMS

[75] Inventors: George Edward Brissey; Eike Richter, both of Erie, Pa.

[73] Assignee: General Electric Company, Wilmington, Mass.

[22] Filed: Apr. 9, 1975

[21] Appl. No.: 566,380

[52] U.S. Cl. .................................. 322/52; 310/214; 310/190; 322/49
[51] Int. Cl.² .......................................... H02P 9/40
[58] Field of Search .......................... 310/214–218, 310/42, 156, 190–193, 152; 322/49–52, 37, 46

[56] References Cited

UNITED STATES PATENTS

| | | | |
|---|---|---|---|
| 1,605,112 | 11/1926 | Huggins | 310/214 |
| 1,684,255 | 9/1928 | Bergman | 310/214 |
| 2,640,956 | 6/1953 | Buchanan | 310/214 X |
| 2,922,058 | 1/1960 | Bacon | 310/214 |
| 3,035,195 | 5/1962 | Jann et al. | 310/214 |
| 3,214,675 | 10/1965 | Foster | 322/46 |
| 3,900,749 | 8/1975 | Carriker | 310/156 |

Primary Examiner—Donovan F. Duggan

[57] ABSTRACT

The instant invention relates to a simple arrangement for adjusting the output power of one or more selected windings of a multiple winding, single phase Permanent Magnet Generator (PMG) without changing the magnetization of the rotor and without modifying the main stator magnetics. Magnetic shims are inserted selectively into one or more of the stator slots and shunt increasing amounts of flux as load current increases, thereby reducing the output of the selected windings without in any way affecting the output of the remaining windings. Alternatively, such magnetic shims may be used to adjust the output of single phase, single winding PMG's that have rotors made of Rare Earth Cobalt permanent magnets which, unlike conventional magnets, cannot be demagnetized.

2 Claims, 6 Drawing Figures

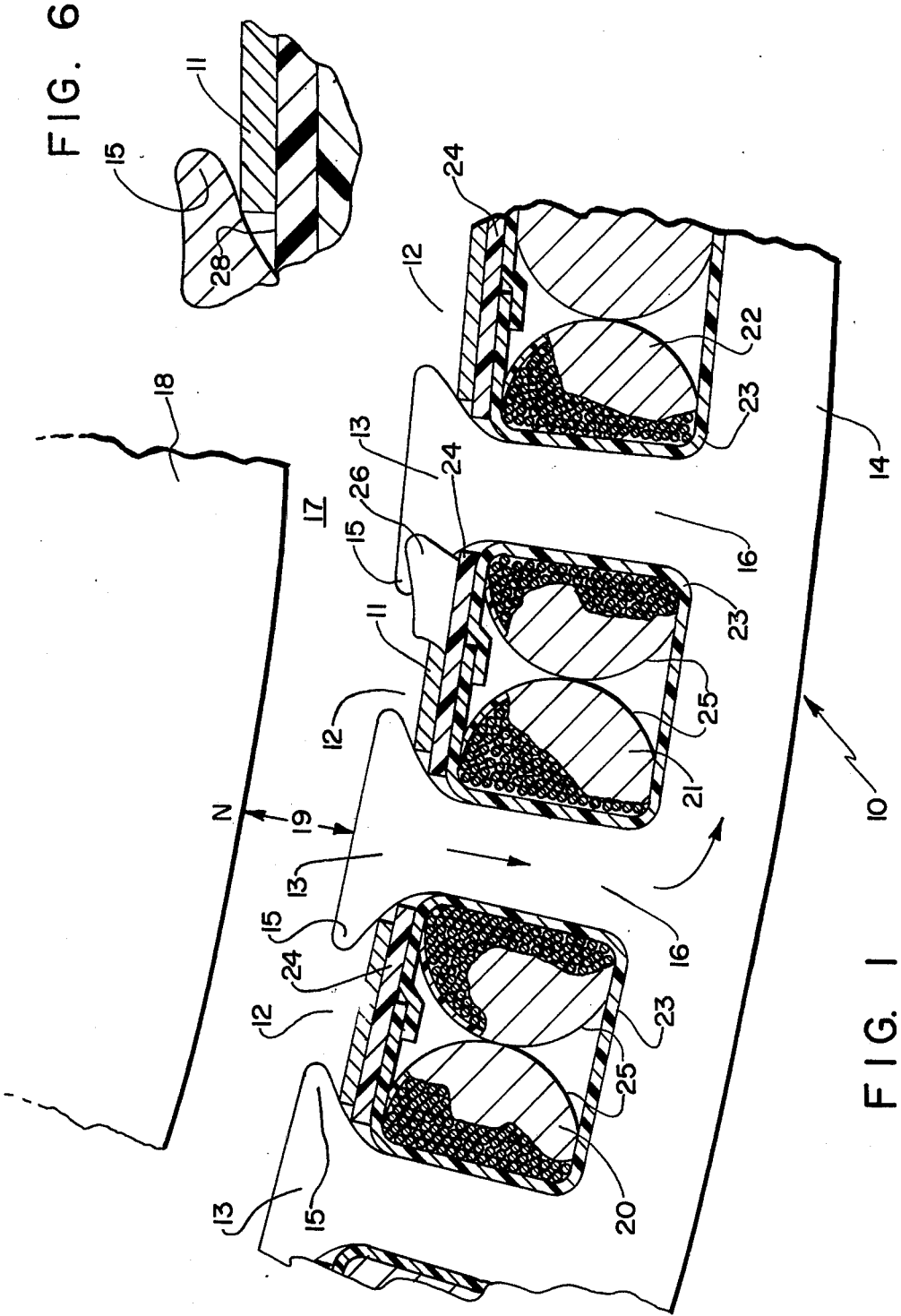

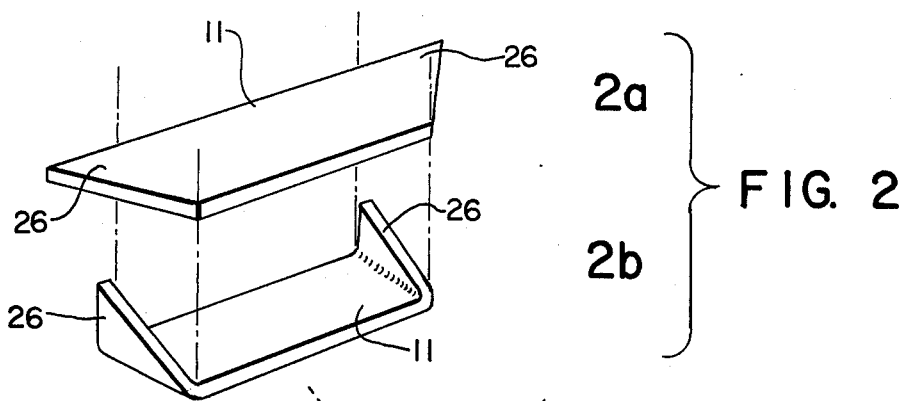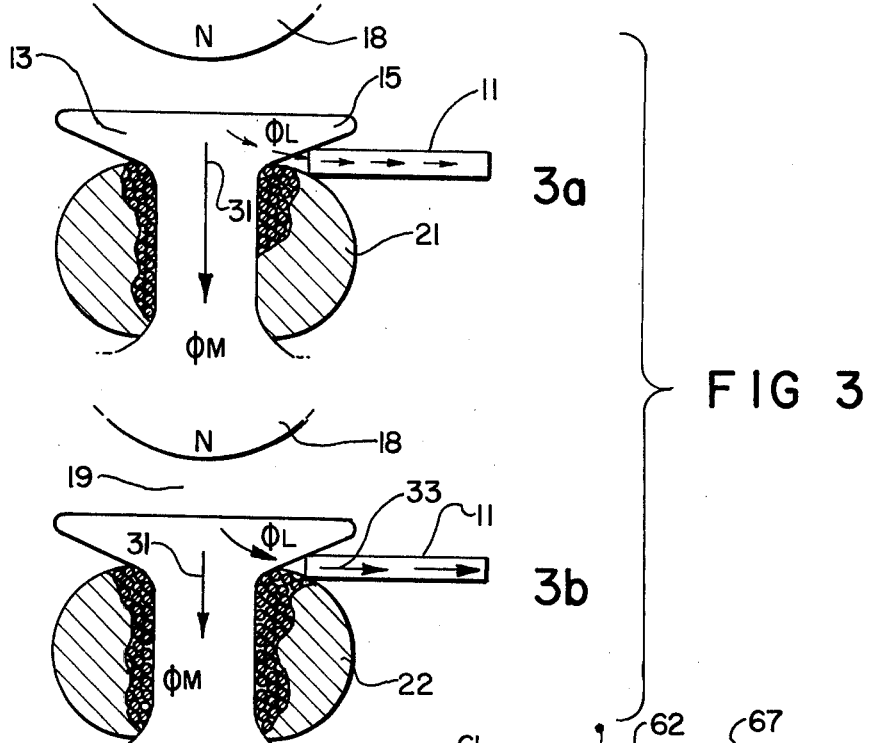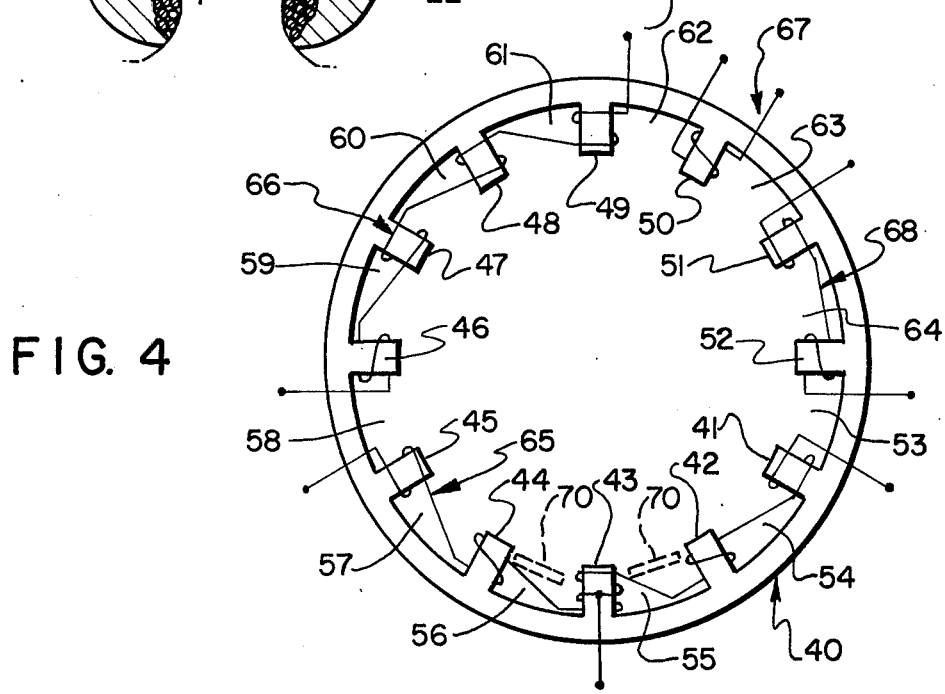

PERMANENT MAGNET GENERATOR WITH OUTPUT POWER ADJUSTMENT BY MEANS OF MAGNETIC SHIMS

This invention relates to generators having selectively adjustable outputs and, more particularly, to Permanent Magnet Generators, the output power of which may be adjusted without changing the rotor magnetization.

In designing Permanent Magnet Generators (PMG's) it is common practice to adjust the machine output power during final assembly and testing by demagnetizing the rotor magnets sufficiently to achieve the desired power output level. This is an acceptable engineering design approach for single phase, single winding PMG's using conventional magnetic materials or with single phase, multiple winding PMG's in which all of the windings are to produce maximum output power.

However, if the requirements are such that not all of the windings of a multi-winding PMG are to produce maximum output over the entire range, then rotor demagnetization is not a suitable solution since rotor demagnetization affects all of the windings in the same manner. Rotor demagnetization is also ineffective in single winding, single phase PMG's which utilize magnets with very high coercive forces. For example, when PMG rotors are fabricated of high energy magnetic materials such as the Rare Earth Cobalt permanent magnets (a typical example of which is Samarium Cobalt), output power adjustment by changing rotor magnetization is not feasible since these materials are virtually impossible to demagnetize. Thus, single winding, single phase machines using Rare Earth Cobalt as the rotor magnets and multi-winding, single phase machines using conventional magnetics, cannot, as a practical matter, have the power output adjusted selectively by demagnetization.

Adjustment of the output of a single winding in a multiple winding machine is, of course, possible by suitable design of the machine magnetics. For example, by having different slot configurations along the bore circumference, the output of one of the windings can be modified without affecting the output of the outer windings as the machine comes up to load since the slot inductance varies with the configuration and will in turn affect the winding reactance and hence the current as the machine goes from no load to short circuit conditions. However, once the machine is assembled, no adjustment of the output power is possible by this means. In addition, from the standpoint of manufacturing efficiency, the use of stator punchings having different slot configurations in the same punching is not particulary desirable since it is more efficient and less costly if common stator punchings can be used for all machines rather than having to assemble some machines from special stator punchings in order to adjust the output of one winding.

A need therefore exists for an arrangement by means of which the output power of selected windings of a multi-winding PMG may be readily adjusted after the machine is built without affecting the output of the remaining windings. This obviously requires an arrangement which does not depend upon partial demagnetization of the rotor since the rotor is in the same flux exchange relationship with all the windings and thus affects them the same way. Similarly, there is a need to adjust output power for PMG winding in those circumstances in which the level of rotor magnetization cannot, as a practical matter, be changed; i.e., where the rotor is fabricated of magnetic materials which have extremely high coercive forces such as the Rare Earth Cobalt materials. Furthermore, these adjustments should be effectuated in a manner which is simple from a manufacturing standpoint, does not substantially add to the cost of the machine, and can be carried out with a minimum of difficulty after the machine has been assembled.

Applicant has discovered that all of these desirable results can be accomplished by controlling the flux distribution in selected portions of the stator electromagnetic circuit without modifying the stator slot configuration. This control of flux distribution in selected portions of the stator can be achieved by the use of magnetic shims inserted into selected slots to shunt portions of the flux and thereby adjust the output of selected ones of the machine windings.

It is therefore a principal objective of this invention to provide a Permanent Magnet Generator in which the output power may be adjusted without varying the magnetization level of the rotor magnets.

Another objective of the invention is to provide a Permanent Magnet Generator in which the output from one of a plurality of windings may be independently adjusted.

Still another objective of this invention is to provide a Permanent Magnet Generator in which the output power may be adjusted without varying either the magnetization level of the rotor magnets or the distribution or the windings or changing the main stator magnetics.

Still other objectives and advantages of the instant invention will become apparent as the description thereof proceeds.

The various objectives and advantages of the invention are realized in a Permanent Magnet Generator construction in which magnetic shims are inserted into selected slots of the stator to affect the flux distribution in the stator electromagnetic circuit and adjust the output of the windings in these selected slots. At no load, the reluctance of the magnetic shim, plus the air gap between the stator teeth and the shim is so much greater than that of the main magnetic path, that the shim has virtually no effect on the output of the winding positioned in the slot containing the shim. As load increases, the current in that winding generates a magnetomotive force (MMF) which opposes that driving flux through the main stator magnetics. This effectively reduces the permeance of the main stator magnetic path. This, in effect, increases the relative permeance of the path including the shim so that it diverts increasing amounts of flux. The flux diverted by the shim is a leakage flux so that the leakage inductance varies significantly as current increases thereby reducing the output of the affected winding with load. Thus, the shim has very little effect at no load but has a substantial effect with load thereby reducing the output power of the selected winding without in any way effecting the remaining windings.

The novel features believed characteristic of this invention are set forth with particularity in the appended claims. The invention itself, however, together with its organization and method of operation may best be understood by reference to the following description taken in conjunction with the accompanying drawings in which:

FIG. 1 is a partial illustration of a PMG stator and rotor showing a magnetic shim in one stator slot;

FIGS. 2a and 2b are perspective views of the magnetic shim configuration;

FIGS. 3a and 3b are schematics illustrating the flux distribution between the rotor, the stator teeth and the shims at no load and under load conditions;

FIG. 4 is a schematic of a single phase, multi-winding Permanent Magnet Generator showing the core and winding distributions in the various slots and the location of the shim to affect selective portions of one of those windings;

Figure 5:
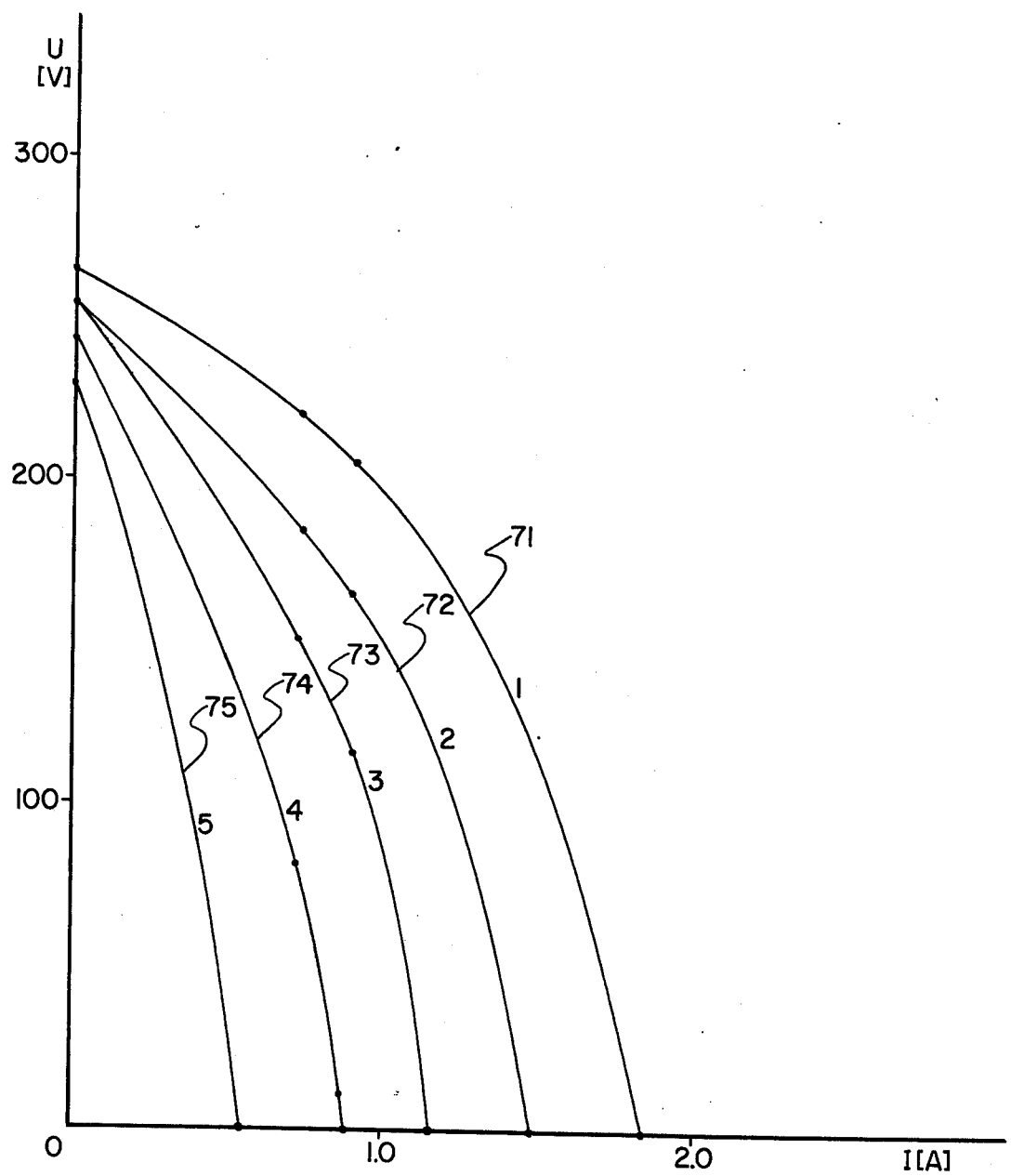

FIG. 5 graphically illustrates the volt-ampere curves for one of the selected windings of the stator of FIG. 4 showing the effect of the shims on the output FIG. 6 is an enlarged, partial detail of FIG. 1 showing the magnetic shim positioned in a stator slot.

FIG. 1 of the drawings shows a partial, sectional view of a PMG stator core 10 having a magnetic shim 11 positioned in one of a plurality of stator slots 12.

The stator 10 is fabricated in the usual fashion of a plurality of stacked metal lamination, not shown, having a plurality of teeth 13 extending radially from a yoke 14. The stator teeth are of the salient or overhanging type and include a salient tip portion 15, a stem portion 16 extending radially from yoke 14. Stator teeth 13 thus define a plurality of semi-open stator slots 12 that communicate with a bore 17 in which a permanent magnet rotor 18 is mounted. Flux from rotor is passed across air gap 19 formed between rotor 18 and stator teeth 13 to induce a voltage in the windings disposed in slots 12.

Stator slots 12 have a slightly tapered but substantially rectangular configuration of a predetermined width and depth to receive coils 20, 21 and 22 which are wound around the pole stems. The coils are insulated from the stator core by means of slot liners 23 which may be formed of any suitable insulating material. Typically, a polyester film, such as that sold by the DuPont Co. under its trade designation "Mylar," having a thickness of 7.5 mils or so, may be inserted into the slot to perform this function. Slot liners 23 preferably extend all the way to the top of the slot and to the base of teeth 13 and partially overlap so that the windings are completely insulated from the armature metal. A non-magnetic, insulating wedge 24 made of any suitable material such as polyimide film sold by DuPont under its trade name "Kapton," is inserted over the slot lining and underneath the stator teeth so that it seats snugly against the underside of the teeth to provide secure anchoring of the slot liners and coils. The slot wedge overlaps slot liners near the top of the slot to provide extra protection against exposure of the top conductors. In addition, the windings may, if desired, be further insulated from each other by means of an insulating tape or winding shown generally at 25.

The power output from selected ones of the windings may be controlled, in accordance with the instant invention by influencing the flux distribution in the electromagnetic circuit of the stator by means of magnetic shims 11 which are selectively positioned in certain ones of the slots to influence the output from the windings positioned in those slots without in any way influencing the flux distribution in the remaining windings. The magnetic shim consists of a main body portion which is inserted lengthwise into the slot and fits snugly against the underside of the stator teeth 13 and has tab or end portions 26 which is bent upwardly over the end of the stator teeth to anchor or seat the shim firmly against longitudinal movement.

As may be seen most clearly in FIG. 2a, magnetic shim 11 is generally of trapezoidal configuration having two triangular end portions 26. The shim which is typically made up of 14 mil 3% silicon magnetic steel, for example, is inserted lengthwise into the slot after the windings have been wound around the pole and the insulating slot wedge inserted. The triangular portions or tabs 26 are then bent upwards over the ends of the stator teeth and the whole assembly may be then impregnated with a suitable epoxy resin. In the assembled position, as may be seen more clearly in FIG. 2b, the end tabs 26 are bent upward to provide a generally U-shaped configuration with the end tabs 26 extending at the outside of the stator bore against the ends of the stator teeth.

The magnetic shim as may be seen most clearly in FIG. 6 which is an enlarged version of the structure of FIG. 1 is positioned on the underside of the stator teeth contacts the salient tip 16 of the tooth. Thus, the magnetic permeance of the path established by the shunting magnetic shim is determined both by the cross section of the shim 11 and by air gap 28 between the shim and the underside of the tooth tip 16. At no load or at low loads the magnetic shim, as will be explained in detail later, has very little effect since the amount of flux shunted by the shim is small compared to the flux which passes through teeth 13, stem 16 and yoke 14. As load current increases the shim diverts more and more flux and has a greater and greater effect on the output. The flux distribution in the stator teeth and the manner in which the magnetic shims influence the flux distribution with load may be most readily understood by looking at the schematic illustrations in FIGS. 3a and 3b. FIG. 3a shows the rotor flux path for the no load condition and FIG. 3b shows the flux paths for the rotor flux and the flux due to current in the windings. Thus, in FIG. 3a for a no load condition, i.e., no current flowing in winding 22, virtually all of the flux from rotor 18, illustrated by the solid arrow 31, flows across air gap 19 into tooth 13 through the stem portion 16 of the tooth and through yoke 14 and an adjacent tooth back to the rotor. Under no load conditions, only a very small portion of the rotor flux, shown by the arrow 32, flows across the air gap 28 between magnetic shim 11 and stator tooth 15. This, due to the fact that at no load, the reluctance of the path including shim 11 (which is of much smaller cross section than that tooth-yoke-tooth main electromagnetic path) and air gap 28 is much greater than that of the main path. Thus, the no load voltage is affected in a very minor way by the presence of the magnetic shim because the permeance of the magnetic path which is in flux exchange relationship with winding 22 is much much larger than the permeance of the path including shim 11. However, as load increases from no load, current starts flowing in winding 22. The current in winding 22 produces an MMF which is opposed to the main MMF driving flux (as shown by arrow 31) through teeth 13 and yoke 14. This reduced the permeance of the main path so that the permeance of the path including shim 11 is now greater relative to the main path permeance than it was at no load. As a result, a greater portion of the flux (as shown by the arrow 33) is diverted through shim 11. The diverted flux is a leakage flux since it does not interact with winding 22. The maximum output current, i.e., the short circuit current, or for that matter, the current at any load level, is determined both by the induced voltage which is proportional to the flux in the tooth and the internal impedance $R + jX$ of the shorted winding. This winding impedance is primarily inductive and is a function both of the slot inductance and the leakage inductance so that diversion or shunting of flux by the shim plays increase the leakage inductance and hence reduces the current. That is, the slot inductance is a function of the magnetic permeance between the two slot sides and is determined strictly by slot geometry since the relative permeability of the air space and the copper in the slot is 1.0. The magnetic shim, on the other hand, has a relative permeability rate larger than air and hence increases the leakage inductance. Thus, any winding associated with a slot which has a shim positioned in the slot has its leakage inductance increased thereby inducing the output current and power. Windings which are associated with slots that do not have such magnetic shims do not show such a large leakage reactance. As a result, the voltage drop across the leakage reactance at any load is less than that for a similar winding affected by a shim so that the output power of these other windings is larger than the output power of the windings with shims. The presence of a magnetic shim at the top of a slot is thus a simple means to adjust the output of selected windings of a multiple winding PMG without in any way affecting the maximum power output of the remaining windings. The amount of flux diverted by the shim and hence, the degree to which the output power is adjusted may be varied by changing the thickness of the magnetic shim, as, for example, by stacking a plurality of such shims at the top of a given slot.

As pointed out previously, this approach is useful not only to adjust the output of selected windings of a multiple winding PMG but may also be used for adjusting the output of a single winding PMG which used conventional magnetic materials in the rotor since it is often simpler to interchange shims with different cross sections than to demagnetize and remagnetize the rotor magnet to correct for design inaccuracies or to adjust the PMG output power to the desired level. Furthermore, the use of these shims is also desirable and useful with PMG's which use high energy magnetic materials such as the Rare Earth Cobalt which are virtually impossible to demagnetize. The output power level of the PMG utilizing such a high energy magnetic material may easily be adjusted by means of the use of one or more of such magnetic shims in the stator slots.

In order to demonstrate the effect of the shims on the output of the stator windings and the effect of the number of shims on the output, a multiwinding, single phase Permanent Magnet Generator was built having a winding distribution illustrated in FIG. 4. FIG. 4 shows, schematically, a Permanent Magnet Generator stator 40 consisting of 12 teeth 41–52 which define a corresponding number of stator slots 53–64. Four windings 65–68 consisting of a varying number of coils are wound about stator teeth 41–52. Magnetic shims 70 are selectively positioned in slots 54–57 associated with winding 65 to adjust the output of this winding with load. The voltage and current characteristics of winding 65 was measured from no load to short circuit conditions to determine the effect that the shims as a function of shim location and the shim cross section. A coil having 200 turns of wire was wound around stator tooth 42, a center tapped coil having two sections of 50 turns each was wound on tooth 43, a 200 turn coil wound on tooth 44 and two coils of 50 turns each were wound on stator teeth 45 and 41. The voltage and current characteristics across the output terminals of winding 65 were measured for various combinations of shims and shim locations. In one instance, no stator shims were inserted in any of the slots and the voltage-ampere characteristics of the winding was determined from no load to short circuit conditions. 14 mil shims of 3% silicon steel were then inserted in each of slots 54 and 57 and the voltage-current characteristic measured. Two 14 mil shims were placed in each of slots 54 and 57 and the voltage-current characteristics measured. In a further test, two 14 mil shims were inserted in slots 56 and 55 (and thus affected a different number of winding turns) and the current voltage characteristics measured. In yet another test, two 14 mil shims were positioned in each of slots 54 through 57 and the current-voltage characteristics measured.

FIG. 5 illustrates graphically the current-voltage characteristics for each of the tests described above. Thus, FIG. 5 shows the output voltage across the winding terminals plotted along the ordinate in volts and the load current plotted along the abscissa in amperes. Curve 71 represents the volt-ampere characteristics of the winding without shims in any of the slots. Curve 72 shows the volt-ampere characteristics with one 14 mil shim positioned in each of slots 54 and 57, curve 73 represents the volt-ampere characteristics with two 14 mil shims positioned in each of slots 54 and 57. Curve 74 represents the volt-ampere characteristics with two 14 mil shims positioned respectively in slots 55 and 56 whereas curve 75 represents the output characteristics with two 14 mil shims positioned in each of the slots 54 through 57. It is obvious from these curves that the output from the winding is affected substantially by the presence of the shims. Thus, by increasing the number of shims in the slots (i.e., providing greater the cross section) and by increasing the number of slots that have shims in them (i.e., increasing the number of turns affected) results in an increase in the power output adjustment range. Comparing curves 72 and 73, for example, it can be seen that increasing the number of shims, and hence the cross sectional area of the flux diverting path, reduces the output. By increasing the number of slots which have shims and hence the number of turns affected also reduces the output of the winding as may be seen by comparing curve 75 (with shims in all slots) with curves 73 and 74 (with shims in selected slots). By selecting the location of the shims so as to vary the number of turns affected also adjusts the output. Thus, although the same number of shims and the same number of slots are utilized, i.e., two shims in each of two of the slots, one curve, curve 74 (slots 55 and 56), shows a greater effect since the shims are positioned in a slot which affects a greater number of turns than the shims in the other slots (slots 54 and 57).

Overall, for this particular machine, the short circuit current can be reduced from roughly 1.83 amps to 0.56 amps (a ratio of better than 3 to 1) by varying the number and positioning of the shims in the slots. The no load voltage variations due to the shims are much smaller ranging roughly from 230 to 264 volts or (a ratio fo 1.14 to 1). The change in no load voltage is thus relatively small, 14% whereas the desired change in the output power range varies as much as 3 to 1.

The use of magnetic shims to influence the flux distribution in the stator electromagnetic circuit thus provides an effective yet simple arrangement for adjusting the power output of selected windings of a PMG. The arrangement is simple from a manufacturing standpoint, is highly flexible in that quite a wide range of variations in the output may be achieved merely by selecting different numbers of shims and different locations, while minimizing costs.

While certain preferred features of this invention have been shown by the way of illustration, it will be obvious that modifications will occur to those skilled in the art. It is therefore to be understood that the appended claims are intended to cover all such modifications and changes as fall within the true spirit and scope of this invention.

What is new and desired to be secured by Letters Patent of the U.S. is:

1. In a permanent magnet generator, the combination comprising,
    a. a permanent magnet rotor,
    b. a stator having a plurality of slots and a plurality of windings disposed in said slots,
    c. means for reducing the output from selected windings with increasing load including magnetically permeable means, which comprises a plurality of strips of magnetic material positioned in a selected slot for increasing the leakage flux and thereby the leakage inductance of the windings in the selected slot with increasing load to reduce the output of the selected winding without affecting the output from other windings.

2. In a permanent magnet generator, the combination comprising,
    a. a permanent magnet rotor,
    b. a stator having a plurality of slots and a plurality of windings disposed in said slots.
    c. means for reducing the output from selected windings with increasing load including magnetically permeable means comprising a plurality of strips of magnetic material positioned in a plurality of stator slots for increasing the leakage flux and thereby leakage inductance of the windings associated with the said plurality of strips in the said plurality of stator slots with increasing load to reduce the output of the selected windings in the said plurality of slots without affecting the output from the other windings.

* * * * *